United States Patent [19]

Jones et al.

[11] 3,927,448
[45] Dec. 23, 1975

[54] PELLETIZING MACHINES

[75] Inventors: Herbert Jones; Michael Thomas Dorn, both of Gloucester, England

[73] Assignee: Simon-Barron Limited, Gloucester, England

[22] Filed: Nov. 22, 1974

[21] Appl. No.: 526,241

[30] Foreign Application Priority Data
Dec. 20, 1973 United Kingdom............... 59265/73

[52] U.S. Cl. ........................... 29/116 R; 308/207 R
[51] Int. Cl.² .......................................... B21B 13/02
[58] Field of Search .................. 29/116 R, 116 AD; 425/DIG. 230, 331; 308/207 A, 207 R, 209

[56] References Cited
UNITED STATES PATENTS

| | | | |
|---|---|---|---|
| 1,653,817 | 12/1927 | Millspaugh...................... | 29/116 R |
| 1,931,050 | 10/1933 | Almquist...................... | 308/207 R X |
| 1,988,326 | 1/1935 | Moo........................... | 308/207 R X |
| 2,701,430 | 2/1955 | Lorig........................... | 29/116 R X |
| 2,714,229 | 8/1955 | Rulin-Miller..................... | 29/116 R |
| 2,962,770 | 12/1960 | Ingraham........................ | 29/116 R |
| 2,972,787 | 2/1961 | Sommer et al.................... | 29/116 R |
| 3,467,031 | 9/1969 | Hafliger........................ | 425/331 |
| 3,551,950 | 1/1971 | Moyakawa et al................. | 425/331 |
| 3,717,308 | 2/1973 | Reinhall...................... | 308/207 R X |

*Primary Examiner*—Alfred R. Guest
*Attorney, Agent, or Firm*—Norris & Bateman

[57] ABSTRACT

A pelletizing roller of the kind which engages with the inner peripheral surface of an annular die having radial holes therethrough whereby a pelletizable material such as animal foodstuff, for example, is forced through said holes as the die is rotated, and comprised by a roller shell, mounted on a shaft by means of two axially spaced roller bearing arrangements each comprised by an inner race, an outer race and a plurality of rollers therebetween, characterized by the provision of spacing means located between said bearing arrangements and comprised by a ring formed in parts to permit its location in a groove on the inner periphery of the roller shell, and means whereby the parts of the ring are held in position when the pelletizing roller is fully assembled.

11 Claims, 6 Drawing Figures

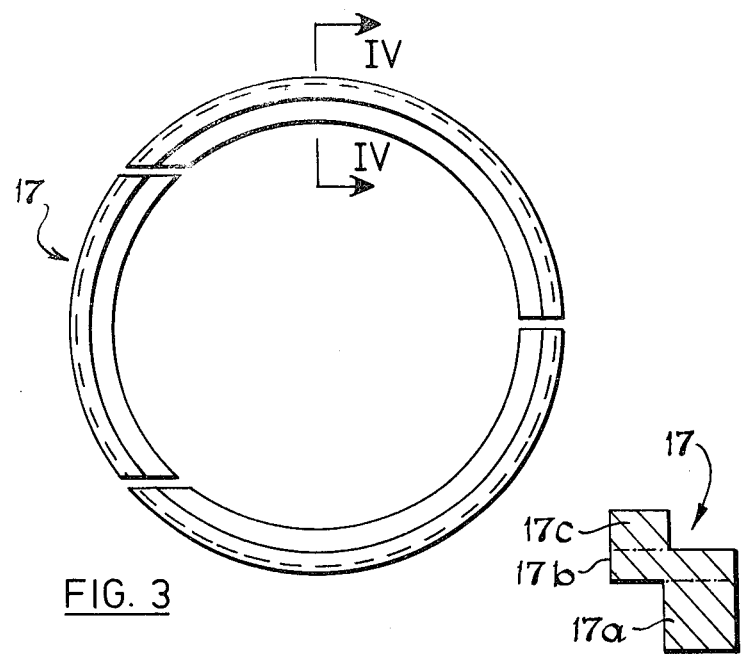
FIG. 3
FIG. 4
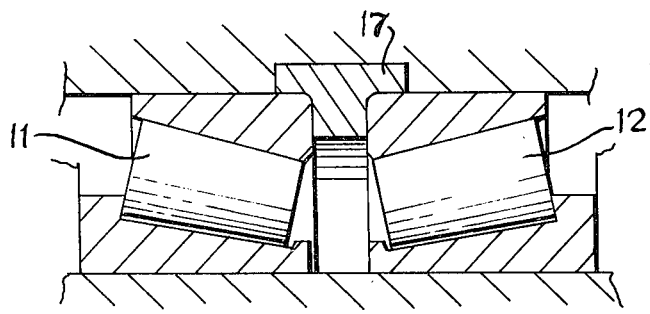
FIG. 5
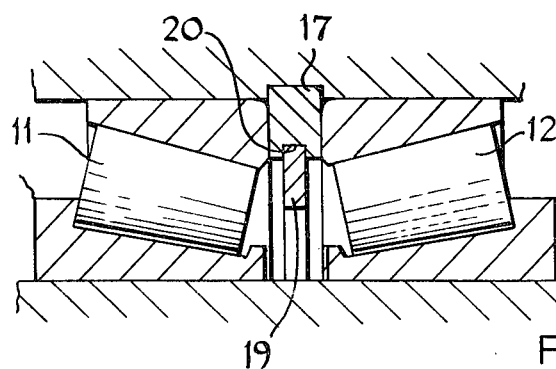
FIG. 6

PELLETIZING MACHINES

This invention relates to a pelletizing roller of the kind (hereinafter termed of the kind referred to) which engages with the inner peripheral surface of an annular die having radial holes therethrough whereby a pelletizable material such as animal foodstuff, for example, is forced through said holes as the die is rotated.

A pelletizing roller of the kind referred to is conventionally comprised by a roller shell mounted on a shaft by means of two axially spaced roller bearing assemblies held in spaced relationship by means of one or more circlips, which engage a groove machined in the inner periphery of the roller shell. This method has a serious disadvantage in that such circlips are of limited strength and must take the full side thrust resulting in severe wear and subsequent breakage.

It is an object of the present invention to provide a pelletizing roller which overcomes the disadvantage aforesaid.

According to the present invention, a pelletizing roller of the kind referred to and comprised by a roller shell mounted on a shaft by means of two axially spaced roller bearing arrangements each comprised by an inner race, an outer race and a plurality of rollers therebetween, is characterised by the provision of spacing means located between said bearing arrangements and comprised by a ring formed in parts to permit its location in a groove on the inner periphery of the roller shell and means whereby the parts of the ring are held in position when the pelletizing roller is fully assembled.

The invention will be further apparent from the following description with reference to the figures of the accompanying drawings which show, by way of example only, three forms of pelletizing roller embodying the invention.

Of the drawings:

FIG. 3 shows a plan view of the spacing member between the roller bearing arrangements of the roller of FIG. 2;

FIG. 4 shows a cross-section through the spacing member on the line IV—IV of FIG. 3;

FIG. 5 shows a fragmentary cross-section through a second form of pelletizing roller;

and FIG. 6 shows a fragmentary cross-section through a third form of pelletizing roller.

Figure 1:
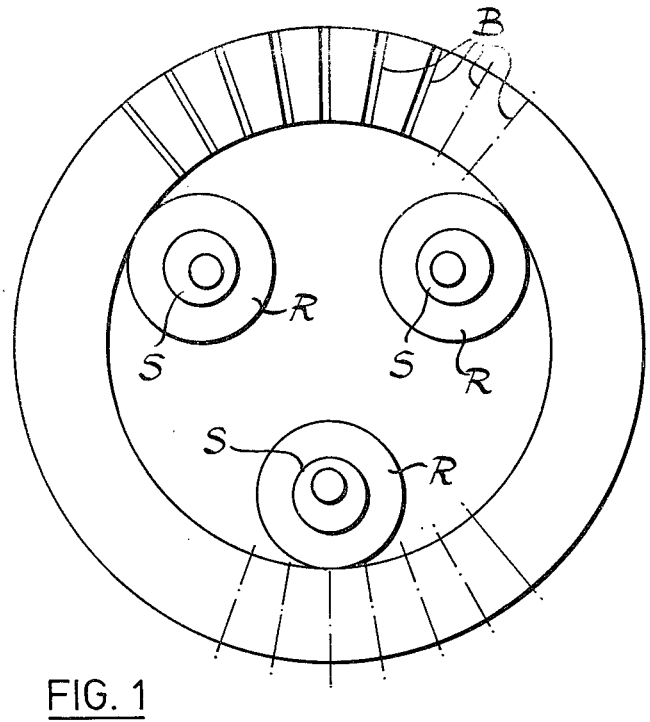
FIG. 1 shows a diagrammatic cross-section through a pelletizing machine having three pelletizing rollers mounted within the annular die of the machine.

Referring first to FIG. 1 of the drawings, it will be seen that the pelletizing machine is of known kind, comprising an annular die D having a multiplicity of radial bores B therethrough, and which is adapted to be rotated about its central axis, whereby material introduced into the die is extruded through the bores B by the action of three pelletizing rollers R, which are freely rotatable on shafts S and which engage the inner peripheral surface of the die D.

Figure 2:
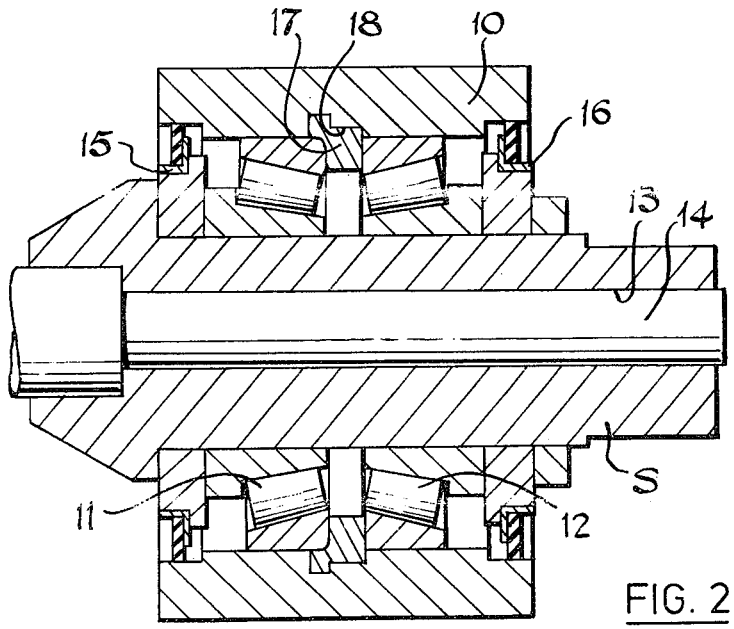
FIG. 2 shows an axial section through one of the pelletizing rollers of FIG. 1.

Referring now to FIG. 2, it will be seen that each of the pelletizing rollers R is comprised by an annular roller shell 10 which is mounted for free rotation about a shaft S by two axially spaced roller bearing arrangements 11 and 12. The shaft S has an eccentric bore 13 by which it is mounted on a stub axle 14. It will be understood that the clearance between the outer surface of the roller shell 10 and the inner peripheral surface of the die D can be adjusted by rotating the shaft S about the stub axle 14.

Sealing means generally indicated at 15 and 16 are provided, and prevent ingress of material being pelletized to the roller bearing arrangements 11 and 12.

The roller bearing arrangements 11 and 12 are held in spaced relationship by a ring 17. The cross-sectional shape of the ring 17 includes a portion of L-shape comprised by limbs 17a and 17b. The cross-sectional shape of the ring 17 also includes a portion 17c which extends outwardly from the end of the limb 17b on the side thereof remote from the limb 17a. A groove 18 of L-shape is machined in the inner peripheral surface of the roller shell 10, the parts 17b and 17c of the cross-sectional shape of the ring 17 being adapted to fit into the groove 18 such that the part 17a protrudes to form a spacing member between the bearing arrangements 11 and 12 extending around the periphery of the roller shell 10.

The ring 17 is provided in three parts whereby it can be positioned within the groove 18 during assembly of the pelletizing roller. It will be appreciated that at least one part of the ring 17, and that part adapted to be fitted into position last, must be separated from the remainder of the ring by cuts which are either parallel to one another, or which if projected would meet at a point outside the periphery of the ring 17.

As can clearly be seen from FIG. 2, when the pelletizing roller is completely assembled the parts of the ring 17 are held in position by the outer race of the bearing arrangement 11 which engages with the limb 17b. The shape of the groove 18 is such that it is impossible to insert the ring 17 in such a manner that the spacing member constituted by the limb 17a is offset from its correct central position.

Referring to FIG. 5, it will be seen that the arrangement is generally similar to that of FIG. 2 save that the ring 17 is of T-section. It will be seen that the pieces of the ring 17 in this embodiment are held in position by engagement of the outer races of both of the bearing arrangements 11 and 12 with the underside of the opposed limbs of the cross-piece of the T-section respectively.

Referring now to FIG. 6, it will be seen that in a further embodiment the ring 17 is of simple rectangular cross-section, the pieces thereof being held in position by means of a circlip 19 which engages a groove 20 machined in the inner peripheral surface of the ring 17. It will be noted that the races of the bearing arrangements 11 and 12 do not, however, bear against the circlip 19.

It will be appreciated that it is not intended to limit the invention to the above example only, many variations, such as might readily occur to one skilled in the art, being possible without departing from the scope thereof, as defined by the appended claims.

Although it is preferred for the ring to be a complete annulus and thus formed from three parts, a small gap in the ring can be tolerated whereby it may be formed from two parts only.

What is claimed is:

1. A pelletizing roller of the kind referred to and comprised by a roller shell, mounted on a shaft by means of two axially spaced roller bearing arrangements each comprised of an inner race, an outer race and a plurality of rollers therebetween, characterized by the provision of spacing means located between said bearing arrangements, said spacing means comprising a groove on the interior surface of said roller shell at a position between said bearing arrangements, a complete ring divided into plural parts circumferentially seated in said groove, and means holding said ring parts in position in said groove when the pelletizing roller is fully assembled.

2. A pelletizing roller according to claim 1 wherein the cross-sectional shape of the ring is such that the portion which engages said groove is of greater axial extent than the portion which projects from the groove for location between the outer races of the two bearing arrangements, whereby the parts of the ring are held in position by the outer race of at least one of the bearing arrangements which overlies said portion of greater axial extent.

3. A pelletizing roller according to claim 2 wherein the cross-sectional shape of the ring is such that that part thereof which is located within the groove is of L-form, whereby it is only possible for the ring to be located in the groove such that the portion which projects from the groove is properly centred.

4. A pelletizing roller according to claim 2 wherein the cross-sectional shape of the ring is of T-form.

5. A pelletizing roller according to claim 1 wherein the cross-sectional shape of the ring is rectangular, there being a groove on the inner periphery of the ring and a circlip positioned in said last groove holding said ring parts in said first groove in said roller shell.

6. A pelletizing roller according to claim 1 wherein the ring is in three parts and wherein that part of the ring adapted to be fitted into position last is separated from the remainder of the ring by cuts which are parallel with one another.

7. A pelletizing roller according to claim 2 wherein the ring is in three parts and wherein that part of the ring adapted to be fitted into position last is separated from the remainder of the ring by cuts which are parallel with one another.

8. A pelletizing roller according to claim 5 wherein the ring is in three parts and wherein that part of the ring adapted to be fitted into position last is separated from the remainder of the ring by cuts which are parallel with one another.

9. A pelletizing roller according to claim 1 wherein the ring is in three parts and wherein that part of the ring adapted to be fitted into position last is separated from the remainder of the ring by cuts which are on lines which can be projected to meet at a point outside the periphery of the ring.

10. A pelletizing roller according to claim 2 wherein the ring is in three parts and wherein that part of the ring adapted to be fitted into position last is separated from the remainder of the ring by cuts which are on lines which can be projected to meet at a point outside the periphery of the ring.

11. A pelletizing roller according to claim 5 wherein the ring is in three parts and wherein that part of the ring adapted to be fitted into position last is separated from the remainder of the ring by cuts which are on lines which can be projected to meet at a point outside the periphery of the ring.

* * * * *